W. KIESER.
FLUID FLOW MEASURING OR REGULATING DEVICE.
APPLICATION FILED SEPT. 8, 1910.
1,025,809.
Patented May 7, 1912.
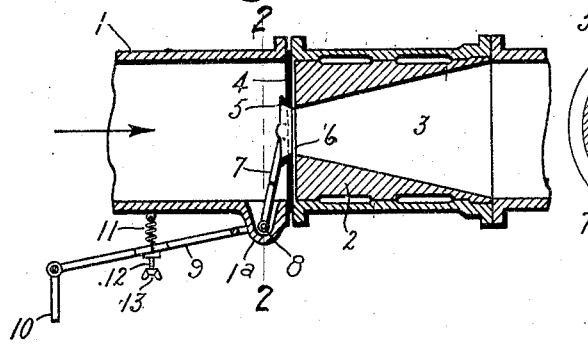
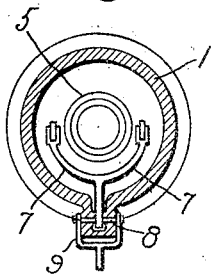
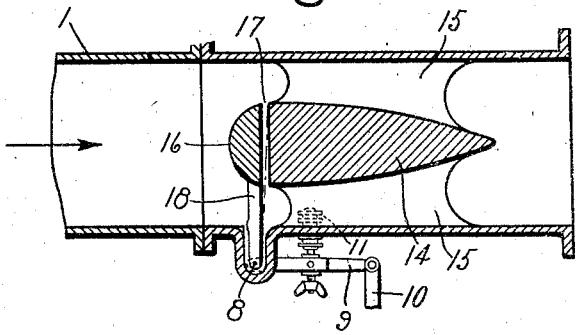
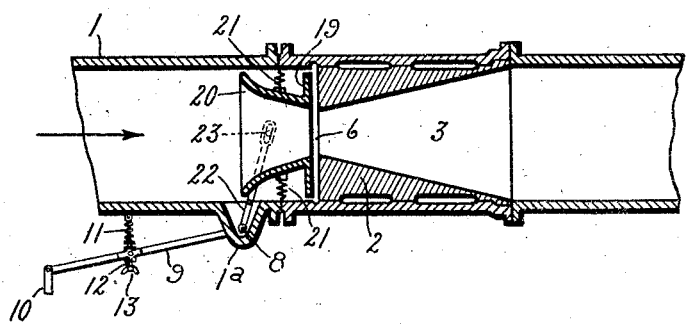
Witnesses:
Inventor,
Walter Kieser,
by Atty.

UNITED STATES PATENT OFFICE.

WALTER KIESER, OF BERLIN, GERMANY, ASSIGNOR TO GENERAL ELECTRIC COMPANY, A CORPORATION OF NEW YORK.

FLUID-FLOW MEASURING OR REGULATING DEVICE.

1,025,809. Specification of Letters Patent. Patented May 7, 1912.

Application filed September 8, 1910. Serial No. 580,964.

*To all whom it may concern:*

Be it known that I, WALTER KIESER, a citizen of Switzerland, residing at Berlin, Germany, have invented certain new and useful Improvements in Fluid-Flow Measuring or Regulating Devices, of which the following is a specification.

This invention relates to apparatus for measuring the flow of a fluid through a conduit or regulating the supply of fluid to a conduit, and its object is to utilize for this purpose the difference in the pressures existing in the conduit and in a constricted portion thereof. In the well known Venturi tube the pressure in the throat is less than that in the conduit on the supply side of said throat. I introduce into the conduit a tubular or like member adapted to form a constricted discharge nozzle at that point, the smaller end of said nozzle being turned toward the flowing fluid. Opposite and adjacent to said smaller end I locate a movable element forming in effect an admission nozzle and biased away from said discharge nozzle by a spring or its equivalent. The flow of the fluid through this compound nozzle produces a partial vacuum in the space or gap between the movable admission and fixed discharge portions of said nozzle, and since the former portion is exposed on its other side to the full conduit pressure, the unbalanced excess of conduit pressure tends to move the movable portion toward the fixed portion against the tension of the spring. By suitably adjusting the spring, the amount of movement of the movable element becomes a measure of the pressure difference, and hence a measure of the volume of fluid flowing through the nozzle, in accordance with the well-known rule with reference to Venturi tubes. In order to indicate the travel of the moving element, it is mounted, for example, on a shaft extending through the wall of the conduit and carrying a lever-arm which can be connected to suitable indicating or registering mechanism, or to means for regulating the supply of the fluid to the conduit.

In the accompanying drawing, Figure 1 is a longitudinal section of a conduit equipped with one embodiment of my flow meter; Fig. 2 is a cross section of the same on the line 2—2, Fig. 1; and Figs. 3 and 4 are sectional views similar to Fig. 1, showing modifications of the device.

In the conduit 1 is introduced the discharge nozzle which in Fig. 1 appears as a tubular bushing 2 for the conduit having a central passage 3 flaring from a narrow entrance to a wide delivery end. A short distance in front of the narrow entrance is located a flexible diaphragm or partition 4 secured firmly at its periphery to the conduit, preferably by being clamped in the joint between two sections of the conduit. The diaphragm has at its center an opening surrounded by a short mouth-piece 5. The opening is practically of the same size as the narrow entrance to the bushing, and the mouth-piece and bushing together constitute a compound admission and discharge nozzle in the conduit which effects a reduction in pressure and a corresponding increase in velocity of the fluid flowing therethrough. Between the diaphragm and the front face of the discharge nozzle is a gap 6. Bearing against the diaphragm on both sides of the mouth-piece are the arms of a forked lever 7 which is secured to a shaft 8 passing transversely through a small pocket 1ª at one side of the conduit. Secured to the shaft outside of said pocket is a lever-arm 9 which is connected by a rod 10 with any desired indicating or registering or regulating apparatus (not shown). The admission nozzle is biased away from the discharge nozzle by some suitable yielding device, such as a spring 11, attached at one end to a suitable support and at the other to a screw-threaded rod 12 which passes through an eye in the lever-arm 9 and is provided with a thumb nut 13 for the purpose of adjusting the tension of said spring.

In Fig. 3 the constricted opening through the discharge nozzle is annular, being formed by a conical body 14 centrally supported in the conduit by wings 15. The base of the cone faces the flowing fluid, and adjacent to said base is a hemispherical body 16 equal in diameter to said cone and arranged with its flat side facing the base of the cone with a gap 17 between them. This movable body 16 is mounted on a lever 18 carried on the shaft 8 which is provided with a lever 9 and adjustable spring 11.

In Fig. 4 the discharge nozzle 2 is the same as in Fig. 1, but the admission nozzle consists of a loose disk 19 nearly filling the conduit and carrying a large funnel 20 which receives practically all the fluid flowing in said conduit. The disk is held yieldingly in a central position a little distance away from the bushing 2, by means of springs 21 extending radially from the funnel to the walls of the conduit. The arms of the forked lever 22 are slotted to engage with pins 23 on the sides of said funnel.

The operation is as follows: Upon that side of the movable admission nozzle, which is turned toward the flowing fluid, there is exerted a pressure which varies with that of the fluid. In the gap between the movable element and the front face of the stationary discharge nozzle there exists, on the other hand, a much lower pressure, being the same as that in the narrow constricted entrance of the discharge nozzle,—a pressure which may be reduced, by suitably forming the nozzle, to the critical pressure, that is, the pressure having such a relation to the pressure in the conduit as to give the maximum flow through the nozzle. The moving element or admission nozzle will, therefore, have a tendency to approach the face of the discharge nozzle, said tendency varying with the amount of fluid flowing through the nozzle and being opposed by the tension of the spring. In consequence of this, the rod is actuated in accordance with the amount of the fluid flowing through the device. The construction shown in Fig. 4 permits the utilization of the entire pressure prevailing in the gap, without hindrance of any sort to the passage of the fluid through the admission nozzle.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. The combination with a conduit, of a discharge nozzle therein affording a constricted opening, an admission nozzle in front of the discharge nozzle, means mounting the nozzles in the conduit so that there is a gap between them, and means connected to one of the nozzles for measuring the drop between the conduit pressure and that in the gap.

2. The combination with a conduit, of relatively movable admission and discharge nozzles therein affording a constricted opening therethrough, means mounting the nozzles in the conduit so that there is a gap between them that is in communication with the opening, and means for utilizing the relative movements of said nozzles due to variations in pressure in the conduit and in said constricted opening.

3. The combination with a conduit, of a fixed discharge nozzle therein affording a constricted opening, a movable admission nozzle in front of the discharge nozzle, there being a gap between the nozzles that is in communication with the opening, means biasing said nozzles apart, and means for transmitting the movements of said admission nozzle due to the variations between the conduit pressure and that in said gap, said pressures acting on opposite sides of the nozzle.

4. The combination with a conduit, of a fixed discharge nozzle therein affording a constricted opening, a movable admission nozzle in front of said discharge nozzle, there being a gap between the adjacent faces of the nozzles that is in communication with the opening, a lever connected with said admission nozzle, a transverse shaft on which said lever is mounted, a lever-arm on said shaft outside the conduit, and a spring acting upon said lever-arm.

5. The combination with a conduit through which fluid flows, of a member arranged in the conduit to form an orifice or nozzle through which fluid flows from one section of the conduit to another, the inlet area of said orifice or nozzle being smaller than the cross-section of the conduit and the nozzle acting to cause a drop in pressure in its inlet portion, a second member mounted in the conduit with one of its faces adjacent to the face of the inlet end of the first member so that there is a narrow gap between them communicating with the inlet portion of the nozzle, said second member being movable by variations in the resultant pressure on its opposite faces as the rate of flow through the conduit varies, and means for transmitting movements of the second member.

In witness whereof, I have hereunto set my hand this 23d day of August, 1910.

WALTER KIESER.

Witnesses:
ERICH UBERLÉE,
GUSTAV HULBROCH.